United States Patent [19]

O'Connell

[11] Patent Number: 4,666,330
[45] Date of Patent: May 19, 1987

[54] BALL JOINT ASSEMBLY

[75] Inventor: Timothy B. O'Connell, Fort Wayne, Ind.

[73] Assignee: Tuthill Corporation, Oak Brook, Ill.

[21] Appl. No.: 805,317

[22] Filed: Dec. 4, 1985

[51] Int. Cl.[4] .............................................. F16C 11/06
[52] U.S. Cl. .................... 403/143; 403/141; 403/326; 29/149.5 B
[58] Field of Search ............... 403/141, 326, 136, 122, 403/143; 29/453, 441 R, 149.5 B

[56] References Cited

U.S. PATENT DOCUMENTS

| | | | |
|---|---|---|---|
| 2,787,128 | 1/1974 | Maistrelli | 403/135 |
| 2,856,250 | 10/1958 | Thoma | 403/9 |
| 3,862,807 | 1/1975 | Doden | 403/135 |
| 3,865,499 | 2/1975 | Flichy | 403/326 |
| 4,435,101 | 3/1984 | Sugiyama et al. | 403/122 |

FOREIGN PATENT DOCUMENTS

| | | | |
|---|---|---|---|
| 337220 | 5/1921 | Fed. Rep. of Germany | 403/143 |
| 2229421 | 1/1974 | Fed. Rep. of Germany | 403/122 |
| 1049919 | 8/1953 | France | 29/441 |

Primary Examiner—Andrew V. Kundrat
Attorney, Agent, or Firm—Pearne, Gordon, McCoy & Granger

[57] ABSTRACT

A ball joint assembly includes a body member having a socket defined by a cylindrical side wall and a bottom wall. A ball stud having a ball end portion is received in the socket, and is adapted to swivel with respect to the body member through a predetermined cone angle. The ball end is retained in the socket by a split retaining ring having a circular cross section which cooperates between the socket and the ball end portion to prevent removal of the ball end portion from the socket. The ring is seated in an arcuate annular seat formed in the cylindrical side wall of the socket, and has an arcuate extent of less than 180 degrees from an intersection of the seat and the socket side wall. A conical bearing wall extends upwardly and inwardly from the arcuate seat to the socket side wall, and is tangent to the arcuate annular seat.

16 Claims, 4 Drawing Figures

BALL JOINT ASSEMBLY

BACKGROUND OF THE INVENTION

This invention relates to ball joints, and more particularly to ball joint assemblies having a retaining ring which permanently entraps and mounts a ball end portion of a ball stud in the socket of a body member.

There exist numerous proposals to provide for the retention of a swivel ball or ball head in a socket which will result in an assembly which provides increased socket housing and ball stud strengths while conforming to applicable industry standards, such as SAE standards. While many prior art devices conform to industry standards and present theoretically acceptable designs, tooling costs and assembly techniques make the resulting products commercially unacceptable.

Basically, all of the designs for a permanently assembled ball and socket arrangement are generally the same. A ball head member is received within a cylindrical or hemispherical socket, and is retained therein by some means such as either cold-forming the side wall of the socket over a portion of the ball head or retaining the ball head in the socket by a retaining ring which partially projects into a recess in the socket and partially projects into the socket wall. Commercially acceptable ball and socket arrangements are produced by machining a groove in the side wall of the socket which provides enough clearance in the side wall of the groove for a split retaining ring to be placed therein to accommodate for expansion of the ring for passage of the ball head therethrough. The groove is further machined to provide an oblique bearing wall for the ring to resist the withdrawal of the ball head and to act as a wedge when withdrawal forces are applied to the ball head. This arrangement has several disadvantages. One such disadvantage is the fact that the ring is permitted to ride axially with the ball head upon the application of a withdrawal force to a wedged position which is dependent upon the radii of curvature of the ball head and the cross section of the retaining ring, and upon the slope angle of the retaining wall with respect to the direction of the applied withdrawal force. A precise degree of play or movement of the ball head relative to the socket is required in many installations, and is difficult to determine in a ball and socket constructed in accordance with the above-described technique. Moreover, since sufficient clearance must be provided for the retaining ring to expand upon insertion of the ball head, considerable extra material must be removed from the socket wall. The removal of material from that wall, however, necessarily results in a weakening of the cross section of the socket, even assuming that additional areas of stress concentration are not created. An example of a ball and socket having a groove which is enlarged to accommodate for an expanding retaining ring may be found in U.S. Pat. No. 3,862,807.

Another example of a ball and socket joint having a retaining ring to securely hold a ball head against removal may be found in U.S. Pat. No. 3,787,128. In that patent, excess material is removed from the socket, since the hemispherical nature of the socket dictates that the socket extend no further than to the midpoint of the ball head, while the retaining ring must be located on the withdrawal side of the midpoint. One object of that patent is to provide an assembly in which there exists zero play because of wedging between a retaining ring, the ball and its socket, since the assembly is intended to serve as a swivel engagement between a swash-plate engaging shoe and a piston in a barrel-type hydraulic pump or motor. Tolerances in the assembly must be closely maintained since the insertion path of the retaining ring is wedge-shaped and the machining tolerances dictate the final zero play position of the retaining ring.

Other prior art is found in U.S. Pat. Nos. 2,856,250 and 4,435,101.

SUMMARY OF THE INVENTION

This invention provides a ball and socket assembly which is characterized by ease of assembly and production machining operations and which conforms to industry standards, while exhibiting greatly improved mechanical properties. According to this invention, a ball joint assembly comprises a body member having a cylindrical side wall and a bottom wall which defines a socket therein. A ball stud having a ball end portion is received in the socket and is adapted to swivel with respect to the body member through a predetermined cone angle. The socket side wall has a diameter slightly greater than the diameter of the ball end, and a split retaining ring cooperates between the socket and the ball end portion to prevent removal of the ball end from the socket. The retaining ring is seated in an arcuate annular seat formed in the side wall of the socket. The arcuate annular seat has an arcuate extent of less than 180 degrees from an intersection of the seat with the side wall and corresponds to the radius of the ring to terminate at a conical bearing side wall which extends upwardly from the arcuate seat to intersect with the socket wall. The slope of the conical wall is tangent to the annular seat and parallel to a line of tangency between the ball end and the seated retaining ring to provide a clear insertion passage for the retaining ring.

The device is assembled according to one method by inserting the ball end portion of the ball stud through the inner diameter of the retaining ring. Since the difference between the inner diameter of the retaining ring and the diameter of the ball end portion is very slight, the retaining ring is only slightly stressed and such stress is well within the elastic limit of the material of the ring. With the ring resting upon the ball head adjacent the neck portion of the ball, the ball end portion is inserted in the socket and the ring is slightly compressed and forced along the surface of the ball end and the bearing wall to the arcuate seat which positively locates the retaining ring relative to the ball end portion and the socket wall. The particular location of the seat, and therefore the retaining ring, relative to the ball end portion in its fully bottomed position in the socket determines precisely the amount of play that the ball stud has upon the application of a withdrawal force thereto. The retaining ring moves neither upwardly, downwardly, inwardly, or outwardly, since such movements are respectively resisted by the bearing wall, the arcuate annular seat, the preformed diameter of the ring to slightly larger than the seat diameter, the ball end portion, and the tapered annular seat.

The application of a withdrawal force along the longitudinal axis of the ball stud results in a radial force, applied to the retaining ring and resisted by the conical wall, which is greater than an axial component of the withdrawal force, which would tend to move the retaining ring upwardly and out of its seated position in the arcuate groove. Thus, the greater the withdrawal force, the greater the force which would tend to retain the ring in place.

The technique of assembling the ring in its groove after the ball head is positioned in its socket and the provision of the precisely dimensioned seat for the ring eliminate the need for extra material to be removed from the retaining ring groove, which would otherwise be necessary to permit expansion of the ring as the ball head passes through the ring and into its socket. Thus, the socket is not deprived of structural material which serves to add to the tensile and ultimate strength of the assembly. Furthermore, the removal of excess material from the socket results in thinned socket cross sections which may through-harden after case hardening operations, resulting in extremely brittle sections of the socket.

DETAILED DESCRIPTION OF THE PREFERRED EMBODIMENT

Figure 4:
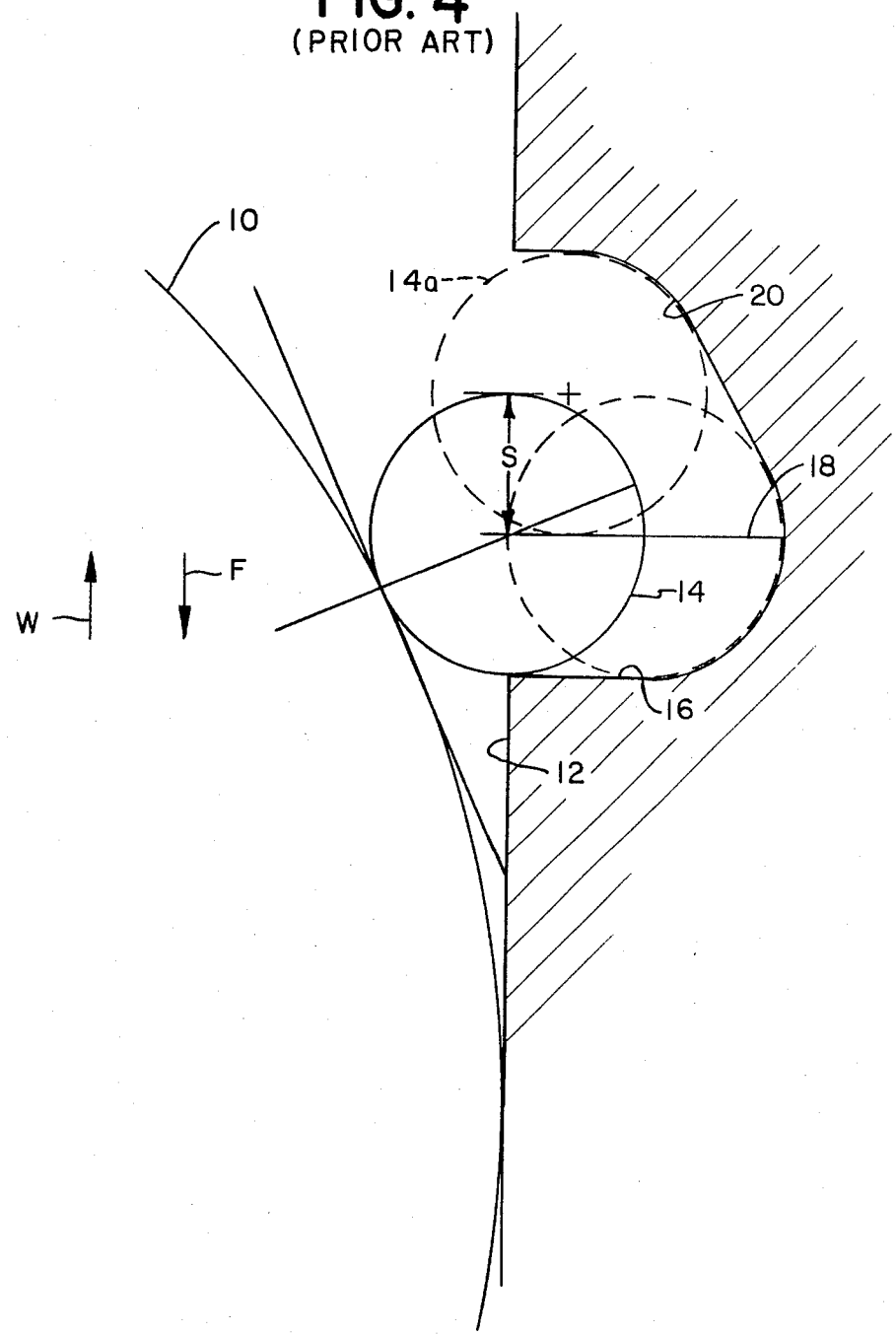
FIG. 4 is a schematic illustration of prior art.

Referring now to the drawings and, initially, to FIG. 4, there is illustrated a ball and socket assembly according to the prior art. The assembly includes a ball end portion 10 which is trapped within a cylindrical socket 12 by a split retaining ring 14. The retaining ring 14 is received within an annular groove 16 and the combination is assembled by first positioning the retaining ring 14 in the groove 16 and forcing the ball end portion 10 in the direction of the arrow F through the inner diameter of the ring 14. Since the ring 14 must provide for the passage of the ball end portion 10, the groove 16 must be deep enough to accommodate the diametrical extent of the cross section of the retaining ring 14. That diametrical extent is indicated by the line 18 in FIG. 4. Since groove 16 having a depth and width merely corresponding to the diametrical extent of the cross section of the ring 14 would not resist pull-out of the ball end 10, because the groove 16 does not have a bearing wall to resist radial expansion of the ring 14, a bearing wall 20 is provided.

As may be seen in FIG. 4, the ball 14 is permitted to float upwardly upon movement of the ball end portion 10 in the direction of the arrow W until the retaining ring 14 reaches the position illustrated in phantom outline 14a and bears against the wall 20. Thus, precise machining techniques must be employed to determine the extent of play of the end portion 10, and the degree of play cannot be less than the distance S, which indicates the extent to which the ring 14 will be carried upwardly until it is wedged against the wall 20.

Figure 1:
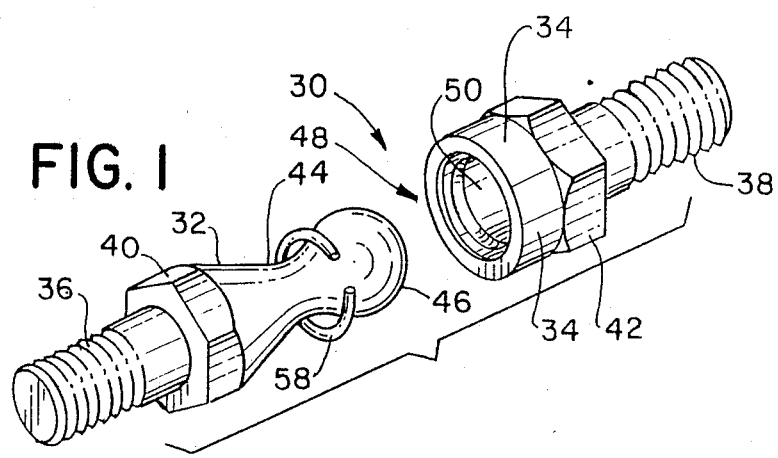
FIG. 1 is an exploded, perspective view of a ball and socket assembly according to this invention.
Figure 2:
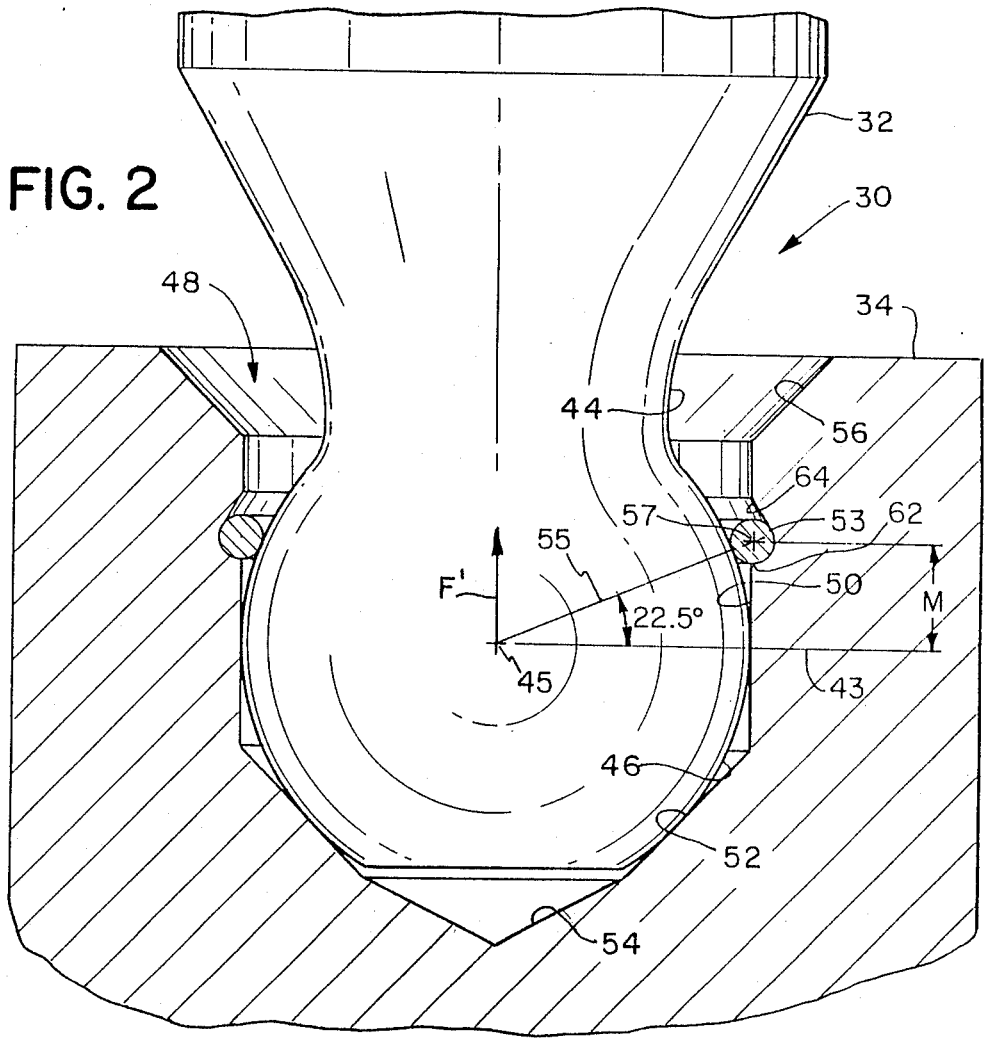
FIG. 2 is an enlarged, fragmentary, cross-sectional view of the ball and socket assembly.

Referring now to FIGS. 1 and 2, there is illustrated a ball joint assembly 30 according to the present invention. The assembly 30 includes a ball stud 32 and a body or base 34. The ball stud 32 and the base 34 are provided with threaded shanks 36 and 38, respectively, and are also provided with conventional hexagonal portions 40 and 42. The ball stud 32 tapers to a narrowed neck portion 44, and is provided at its end with a spherical ball end portion 46.

The ball end portion 46 is received within a socket 48 provided in the base 34. The socket 48 is defined by a cylindrical side wall 50, a bottom wall comprising conical sections 52 and 54, and a conical upper wall 56 having a slope which will accommodate a desired conical swivel angle for the ball stud 32. While the term "cylindrical" as used herein with reference to the cylindrical wall 50 is illustrated in its more generally accepted sense, i.e., the surface traced by one side of a rectangle rotated about the parallel side axis, the term "cylindrical" according to the invention is intended to be interpreted in its broader geometrical sense, i.e., the surface traced by any straight line moving parallel to a fixed straight line.

Figure 3:
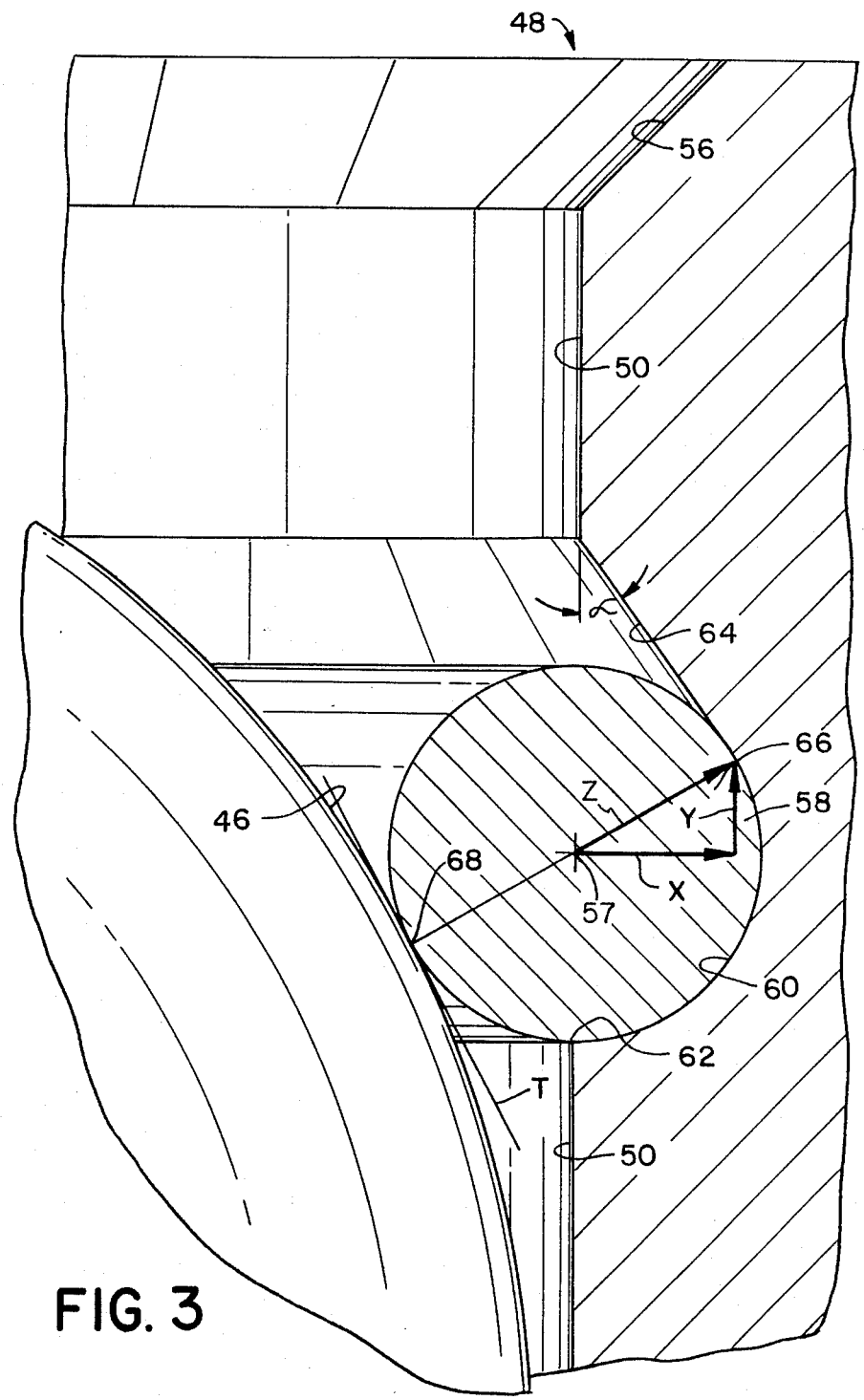
FIG. 3 is an enlarged, fragmentary detail view of the retaining ring and a portion of the ball end.

The ball end portion 46 of the ball stud 32 is permanently locked and retained in the socket 48 by a resilient, split retaining ring 58 having a circular cross section. As may be seen most clearly in FIG. 3, the retaining ring 58 is received and is seated in an arcuate annular seat 60 formed in the side wall 50. The arcuate seat 60 extends from an intersection 62 with the cylindrical side wall 50 to a conical bearing side wall 64 which is tangent to the arcuate seat 60 at a line 66. The arcuate extent of the seat 60, measured from the intersection 62 to the line 66, is greater than 90 degrees but less than 180 degrees, and in the preferred illustrated embodiment is 112½ degrees, with the conical bearing wall 64 forming an angle alpha of 22½ degrees with respect to the side wall 50 of the socket 48. Ring 58 is preferably preformed to an outside ring diameter slightly larger than that of seat 60 such that it snugly nests therein.

Any upward withdrawal force F' (FIG. 2) applied to the ball stud 32 is transmitted to the retaining ring 58 at a point of tangency 68 between the ring 58 and the ball end 46, and has force components X and Y (FIG. 3) produce the resultant force vector Z causing frictional engagement with the surface 64 at point 66 thereby resisting withdrawal of the ball end 46.

The vertical location of the intersection 62 between the arcuate seat 60 and the cylindrical side wall 50 determines the limit of any axial withdrawal travel of the ball end 46 relative to the socket 48 and, therefore, determines the extent of any play that may be designed into the ball and socket joint. As illustrated in FIG. 2, there exists a condition of zero play, but it should be appreciated that one method of obtaining a degree of desired play may be provided by increasing the depth of the cylindrical socket 50, 52.

It may be noted that a line of tangency T drawn through the point 68 of engagement of ball portion 46 with ring 58 is parallel to the conical wall 64. Any divergence of the wall 64 in a clockwise direction as viewed in FIG. 3 from its parallel condition decreases the amount of material in the socket, to thus reduce the strength of the assembly. Moreover, such a divergency would permit the retaining ring 58 to ride upwardly from its seat 60 to an indeterminate position at which the ring could be subjected to being wedged between the ball and the side. Any divergence of the wall 64 in the counterclockwise direction as viewed in FIG. 3 would prevent assembly of the retaining ring 58 in the seat 60 in the manner which will now be explained.

To assemble the ball end portion in the socket to form a permanent connection, the split retaining ring 58 is axially passed over the ball end portion 46 so that it attains the position illustrated in FIG. 1. The split retaining ring 58 is only slightly expanded during this operation, since its inside diameter is only slightly less than the diameter of the ball end portion 46 and well within the elastic limit of the retaining ring. The ball end portion 46 is then inserted into the socket 50 so that the ball end portion 46 engages the conical bottom wall 52. The retaining ring 58 is then pushed downwardly into the socket and is cammed inwardly by the conical wall 56 and is then moved downwardly along the cylindrical wall 50. When the retaining ring 58 reaches the conical wall 64, it springs outwardly until it forcefully nests into its seat 60. Passage between the conical wall 64 and the ball end portion 46 is permitted, since the cross-sectional diameter of the retaining ring 58 does not exceed the distance between the conical bearing wall 64 and the tangent line T.

For optimum ball end retaining conditions, the retaining ring 58 is seated in seat 60 in a position where the center 57 of its circular cross section lies in the imaginary cylindrical extension of wall 50. Also, for optimum ball pull-out strength in relation to maximizing ball stud cone angle, a line 55 connecting the center 57 of the retaining ring 58 and the center 45 of the ball end 46 should form an angle of about 22½ degrees with the line or plane 43 which is perpendicular to the longitudinal axis of the stud 32. In a practical embodiment of the invention, the ball end portion 46 has a diameter of 0.37 inch, the diameter of the cylinder 50 of 0.38 inch, the preformed outer diameter of the ring 58 should be no smaller than 0.400 inch, the corresponding outer diameter of the seat 60 is 0.398 inch, the cross-sectional diameter of the retaining ring 58 is 0.032 inch, and the distance "M" between the center 57 of the ring and line or plane 43 passing through the center 45 of the ball end is 0.08 inch, the line (hereafter plane) 43 being normal to the axis of the socket 50.

The seat 60 is machined to have its cross-sectional center of curvature at the ring center 57 thus positively locating the split ring 58 with its center 57 in the extension of the wall 50. This assures an equal amount of ring cross-section (equal to the cross-sectional radius) to protrude into the cavity space as is nested in the seat 60. This conduces to a well balanced design in terms of ball stud pull-out strength, ball stud cone angle, ring position, and stability.

The radiused or curved cross-section of seat 60 captures and seats ring 58 positively at a desired distance "M" outward from the line or plane 43, this distance "M" in the practical embodiment disclosed being equal to the tangent of the angle of 22½ degrees multiplied by the radius of the cavity 50. This particular dimension "M" provides substantially zero play. In general, the distance "M" determines the amount of play in movement of the ball stud axially of cavity 50 between the limits of engagement with the bottom 52 and the ring 58.

Assuming the dimensions of the aforesaid practical embodiment, except for the location of seat 60, and especially the size of the ring 58, machining the seat 60 to have different dimensions "M" provides corresponding different amounts of play. This thus provides a means by which the amount of play desired may be simply achieved without sacrificing strength in the ball and socket assembly. Freedom of movement of the ball in the socket can thus be controlled and this is important in achieving long wear-life. Lock-up caused by wedging in the prior art designs is avoided, and the degree of play remains constant. Testing has indicated a substantial increase in pull-out strength.

Considering further the matter of controlling the amount of play or clearance, the designer can initially specify the amount of play desired for whatever reason and then determine the precise fixed location of the split ring 58 axially of the cavity 48 required to obtain this play. This determines the location of the ring seat 60. Once the ring 58 is installed, it is incapable of moving, especially axially of cavity 48, by reason of being captured by the seat 60 and taper 64. Thus, the location of seat 60 and taper 64 can be utilized as a variable parameter for providing the degree of play desired and without requiring a ring 58 of different size. This is in sharp contrast with prior art designs in which the split ring is permitted to move within the cavity when engaged by a ball end during exertion of a pull-out force, the ring usually bearing against an inward taper thereby causing it to become wedged and to interfere with ball end swivelling (see for example U.S Pat. Nos. 2,856,250 and 3,787,128).

As to the split ring 58, its design is quite simple and substantially non-critical as to the outer diameter since the seat 60 and taper 64 positively locate and retain the ring 58 once it is installed. Desirably, the ring 58 should have an outer diameter no smaller than seat 60 but may be measurably larger, because once installed, its resilience will forcefully nest it into the circular groove or recess formed by the combined surfaces of the seat 60 and taper 64. Thus, the ring 58 can be of different diameters and still be seated, since its outward resiliance will positively cause it to seat itself. This may be considered in the respect of achieving easily the degree of play desired while avoiding the requirement of the preformed outer ring diameter meeting exact dimensions in order to obtain a workable assembly.

In a working embodiment, the retaining ring ball joint consists of a case hardened, low carbon steel housing and stud, zinc plated with dichromate dip, and a high carbon spring steel retaining ring to capture the ball stud in the housing cavity.

The assembly design and placement of the retaining ring utilizes friction based upon a resolution of forces radially outward being greater than the force in the direction F (FIG. 2), to retain the retaining ring and ball stud in the housing cavity.

The design of the ring seat 60 with its lead in angle tangent to the seat 60 facilitates assembly of the ring 58 and stud 32 sub-assembly into the cavity. The assembly operation then consists of the expansion of the ring 58 over the ball portion 46 inserting both the ball stud and ring into the cavity 50 as an assembly, and then permitting the ring 58 to expand into the seat 60 to capture the ball portion 46. Alternatively, the ball portion 46 may be inserted into cavity 50 followed by mounting of the ring 58 about the neck 44 and then the insertion of the ring 58 past the conical surface 64 into the seat 60.

Recapitulating, the invention, which incorporates a housing member, a ball stud, and a circular cross-section split retaining ring, accomplishes the following objectives:

(1) the ball stud is permanently captured in the housing member cavity by use of the retaining ring;

(2) strength and stability of the assembly are optimized while maximizing the ball stud cone angle;

(3) the clearance between the retaining ring and the ball end of the stud are controllable to determine the degree of "free working" of the assembly while minimizing the possibilities for wedging and binding of the ball end in the cavity especially under conditions of a pull-out force on the ball stud; and (4) such clearance is controlled by means of either the depth of the cavity or the location of the ring seat.

Another embodiment of this invention is like that disclosed in the foregoing except as to the cavity 48. Instead of forming the cavity 48 with an integral bottom, it is drilled through housing member 34 and then fitted with a separate bottom, plug-like part having the contours 52, 54. Prior to installing the bottom part, the ball stud 32 is inserted first through the cavity bore 50 from the bottom side, the hexagonal portion 40 being made to a size as will pass therethrough. The ring 58 may be installed in the seat 60 prior to insertion of the ball stud, which may then be followed by installation of the bottom part to complete cavity 48.

A still further embodiment contemplates a bore-like cavity as described above but without a bottom. Two ring-seat 58, 60 retainers are used, these being spaced apart axially in back-to-back relation. The ball end of the stud is swivelled between the two retainers 58, 60. The two rings may be installed on opposite sides of the ball end after it is positioned within the cavity.

Although the preferred embodiment of this invention has been shown and described, it should be understood that various modifications and rearrangements of the parts may be resorted to without departing from the scope of the invention as disclosed and claimed herein.

What is claimed is:

1. A ball joint assembly comprising a body member having cylindrical side wall means and bottom wall means defining a socket therein, a ball stud having a ball end portion received in said socket and being adapted to swivel with respect to said body member through a predetermined cone angle, said socket side wall means having a diameter slightly greater than the diameter of said ball end portion, a split ring having a circular cross section cooperating between said socket and said ball end portion to prevent removal of said ball end portion from said socket, said ring being seated in an annular seat of arcuate cross-section formed in said side wall means, said seat having an arcuate extent of less than 180 degrees from an intersection of said seat and said socket side wall, with the radius of the arcuate cross-section substantially corresponding to the radius of said ring, and conical bearing side wall means extending upwardly and inwardly from said arcuate seat to said socket side wall means and being tangent to said arcuate annular seat.

2. A ball joint assembly according to claim 1, wherein said ball stud and its ball end portion are axially movable relative to said socket side wall means between a first position wherein said ball end engages said bottom wall means and a second position wherein said ball end engages said ring.

3. A ball joint assembly according to claim 1, wherein the arcuate extent of said annular seat is greater than 90 degrees.

4. A ball joint assembly according to claim 3, wherein the arcuate extent of said annular seat is about 112 degrees and said conical side wall means forms an angle of about 22 degrees with respect to the side wall of said socket.

5. A ball joint assembly according to claim 1 wherein said ball end engages said ring at a circular line of contact to establish mutual lines of tangency with the ring which are parallel to said conical bearing side wall.

6. A ball joint assembly according to claim 2, wherein said second position of said ball end establishes a circular line of contact and establishes mutual lines of tangency with the ring which are parallel to said conical bearing side wall.

7. A ball joint assembly according to claim 1, wherein said ball end engages said ring at a circular line of contact on said ring located about 180 degrees from the intersection of said arcuate annular seat and conical bearing side wall.

8. A ball joint assembly according to claim 7, wherein said circular line of tangency is located about 22 degrees from said intersection of said seat and said socket side wall.

9. A ball joint assembly according to claim 1, wherein the cross section of said ring is bisected by a plane tangent to said cylindrical side wall.

10. A ball joint assembly according to claim 1, wherein an imaginary line connecting the center of said ball end with the center of the cross-section of said ring forms an angle of between about 22 degrees and about 23 degrees with the diameter of the cylindrical side wall of said socket which passes through the center of said ball portion.

11. A ball joint assembly according to claim 10, wherein said angle is about 22½ degrees.

12. A ball joint assembly according to claim 1, wherein the centerline of said ring lies in a plane parallel to a plane passing through the center of the ball end portion and including a diameter of said socket.

13. A ball joint assembly according to claim 1 wherein the position of said ring is fixed with respect to said socket with any upward movement being blocked by said conical bearing wall means, any outward and downward movement being blocked by said arcuate annular seat, and any inward movement being blocked by said ball end.

14. A method of assembling a ball and socket to provide a permanently locked combination, comprising the steps of providing a body member having a cylindrical side wall defining a socket therein, providing a ball stud having a neck portion and a bell end portion having a diameter adapted to be received in said socket, providing an annular groove in said cylindrical side wall having a seat which is arcuate in cross section and having a conical bearing side wall extending upwardly and inwardly from said arcuate seat to said cylindrical side wall, providing a split ring having a circular cross section and having an inside diameter slightly smaller than the diameter of said ball end portion and having an outside diameter slightly larger than the diameter of said cylindrical side wall, inserting said ball end portion into said socket, and, thereafter, seating said split ring onto the seat formed by said annular groove by compressing said ring to conform to the diameter of said cylindrical side wall and permitting said ring to expand to ride along said conical bearing wall toward said seat.

15. The method of claim 14 wherein said socket is provided with a bottom wall integral with said body member, said split ring being resilient and in unstressed condition of larger outside diameter than said annular seat, said seating step including forcing said ring onto said seat into concentric relation therewith.

16. The method of claim 15 including installing said ring over said ball stud before inserting said ball end portion into said socket.

* * * * *